Figures 1, 2, 3, 4:
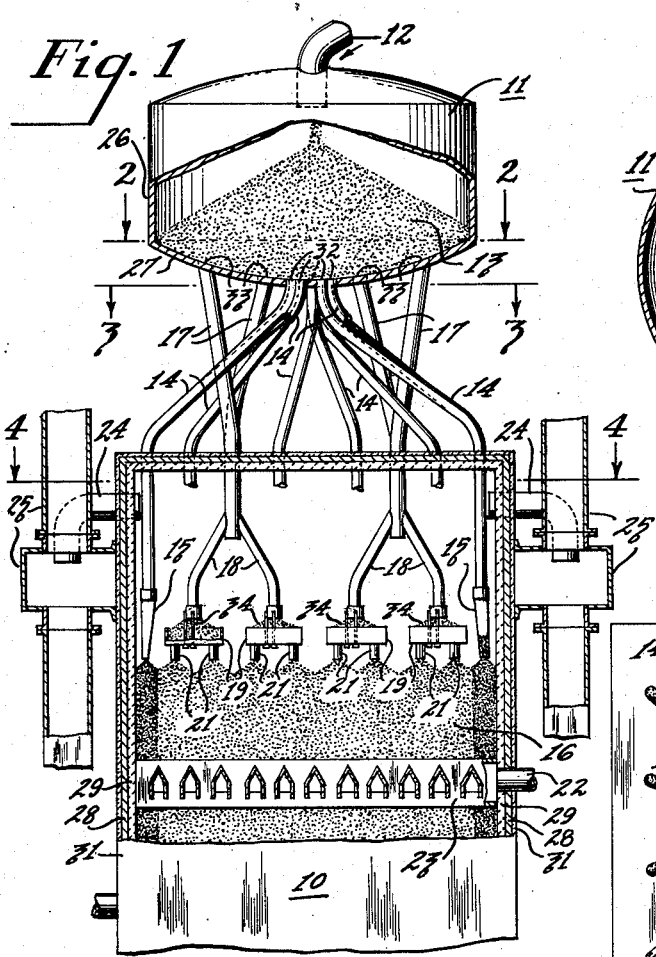

April 8, 1952 C. C. PEAVY ET AL 2,591,719
CATALYST REGENERATION APPARATUS
Filed July 24, 1948

INVENTORS.
Claude C. Peavy
Robert M. Shirk
BY Frank Wm Rose
AGENT.

Patented Apr. 8, 1952

2,591,719

UNITED STATES PATENT OFFICE 2,591,719

CATALYST REGENERATION APPARATUS

Claude C. Peavy, Philadelphia, Pa., and Robert M. Shirk, Wilmington, Del., assignors to Houdry Process Corporation, Philadelphia, Pa., a corporation of Delaware Application July 24, 1948, Serial No. 40,484

5 Claims. (Cl. 23—288)

1

This invention relates to improvements in apparatus employed in the contact of gases with fluent solid particles. Although the present invention includes within its scope various processes, particularly those where heat is evolved as a result of the contact of a gas with a fluent solid as, for example, the oxidation of naphthalene to form phthalic anhydride by granular fluent oxidation catalyst, the application of the present invention to such processes can be understood by the explanation of its use in connection with a hydrocarbon conversion system of the type referred to below, wherein it has particular advantages.

When hydrocarbons contact a catalyst under conversion conditions including elevated temperatures, such as above 600° F., so as to form conversion products containing hydrocarbons different in molecular weight or structure or both, hydrocarbonaceous material, commonly referred to as coke, is concomitantly deposited on the catalyst and causes a reduction in catalytic activity. The catalyst is therefore periodically regenerated, as by contact with a free oxygen containing gas under combustion conditions, to effect removal of the deposit of coke and thus maintain catalytic activity. Accordingly, the hydrocarbon process may be performed as a continuous operation by the use of a technique in which fluent solid hydrocarbon conversion catalyst is circulated in a system comprising a conversion zone and a regeneration zone.

In one method of moving the catalyst through such a system, the solid catalyst is in particulate or grandular form, such as spheres or beads, sized particules, cast or extruded pellets or the like, and is sized so that the pressure drop of vapors passed through a bed of such particles is not excessive, a convenient size being such that the bulk of the catalyst will pass a three mesh screen and be retained by an eight mesh screen. Catalyst of such a size is fluent or capable of flowing and may conveniently be passed through a process zone for contact with process fluids as a downwardly moving non-turbulent bed (i. e., the process fluids, even when in countercurrent flow relationship, do not cause turbulence or ebullience of the solid and hence the bed is in compact, unmixed form).

The wall of vessels that contain such moving beds are subject to attack and corrosion at the elevated temperatures of operation, which temperatures are generally above 700° F. in the reactor vessel and above 900° F. up to as high as 1200° to 1300° F. in the regenerator vessel or

2 kiln. In the latter vessel, the high temperatures are due to the contact of the coked catalyst with combustion supporting gas and will be higher when the combustion supporting gas is furnished to the coked catalyst at a rapid rate particularly if the rate of gas contact is such that the rise in temperature due to combustion of the coke is more rapid than the rate of heat removal which may be by cooling coils embedded in the catalyst or by removal of the heat as sensible heat in the effluent products of combustion. In the reactor, the walls of the vessel are subject to attack by corrosive gases, such as hydrogen sulfide or ammonia, which are produced as a result of the hydrocarbon conversion when the hydrocarbon charge stocks contain nitrogenous or sulfurous compounds.

In accordance with the present invention, operations such as those described herein are effected in a contact zone under conditions as described below such that the walls of the vessel containing the contact zone are protected against high temperatures by minimizing the heat effects occurring in the layer of solid particles adjacent to the walls of such a vessel. A method of reducing the heat effect is by maintaining a low rate of contact of gas with the solid particles near the periphery of the contact zone by flowing fluent solid particles varying in size through the contacting zone in which gas contacts such particles and, by the apparatus described below, effecting a distribution of differently sized particles over the horizontal cross sectional area of the contacting zone such that the particles in the layer adjacent to the periphery of the contact zone are averagely smaller than the particles in the remainder of the zone, which constitutes the major portion of the zone, and thereafter moving all particles in the zone downwardly in substantially compact non-turbulent flow so that this distribution of the particles remains relatively undisturbed. Because of the difference in the size of the particles, the rate of flow of the gases through the layer adjacent to the periphery of the zone is considerably less than in the remainder of the zone and the heat effects are correspondingly reduced.

The principles involved in the present invention are set forth in detail below in connection with the description of the drawing in which a preferred embodiment of the present invention is shown. It is to be understood that this preferred embodiment, which is described in terms of a hydrocarbon conversion process, is to be regarded as illustrating the present invention rather than restricting its scope.

In the drawing, Fig. 1 is a vertical view of the upper portion of a vessel containing a moving bed of solid particles with portions of the vessel broken away for a better view of the relationship of the parts;

Figs. 2, 3 and 4 are transverse sections of the vessel illustrated in Fig. 1 along the lines 2—2, 3—3 and 4—4, respectively, showing the relationship of the parts of the apparatus at these levels.

Shown in Fig. 1 is a closed housing or vessel indicated generally at 10 above which is positioned a supply chamber indicated generally at 11. A stream of solid particles from conduit 12 which is inclined at an angle greater than the angle of free repose of the solid particles passing therethrough and which is only partially filled by the stream of particles, discharges in a restricted area at the apex of a relatively large body or mass of particles 13 contained within supply chamber 11.

A portion of the particles in body 13 is removed through a set of conduits 14 and is discharged by nozzles 15 which are formed and arranged so that they supply the particles flowing therethrough to the contacting zone as a layer closely adjacent to the periphery of the contacting zone at the top thereof, the top of the contacting zone being coincident with the top of bed 16. As explained more fully below, the particles in conduits 14 have a relatively high concentration of small particles. Another portion of the particles in body 13 is removed through a second set of conduits 17, the particles in these conduits having an average size substantially greater than the particles in conduits 14. The particles in conduits 17 pass through conduits 18, baskets 19 and conduits 21 and thereby individually supply a multiplicity of streams to a multiplicity of points evenly and regularly distributed over the horizontal cross sectional area of bed 16. Conduits 21 thus supply the particles flowing therethrough to the remainder of the contacting zone not supplied by nozzles 15, the portion supplied preferably being the major portion as shown in Fig. 4. Bed 16 is a substantially compact body of solid particles which moves downwardly through housing 10 in substantially compact non-turbulent flow. Because the particles adjacent to the periphery have a smaller average particle size than that of the particles in the remainder of the horizontal cross sectional area of the reactor or the contact zone, the flow of gases through the portion of the contact zone adjacent the periphery is advantageously less than that in the remainder of said zone.

Bed 16 may consist of one or more contacting stages but in any event is maintained in downward non-turbulent flow by removing particles from the bottom of the bed through particle removal means located in the bottom of housing 10, (not shown) such as by devices known to the art. Thus, gases may be introduced to the downwardly moving bed through conduit 22 and vapor distributor or collector 23, which is a device used in the art as a gas introducing means, the gas so introduced thereafter passing partially or wholly upwardly to be removed from above the top of the bed by conduits 24 which communicate with a manifold 25 or a portion or all of the gas introduced by distributor 23 may pass downwardly to a vapor collector therebelow (not shown). Alternatively, a vapor distributor similar to distributor 23 may be located below distributor 23 and gas passed upwardly from the distributor not shown to distributor or collector 23 and thereafter be removed. As will be understood by those skilled in the art from the above description, various means of employing bed 16 as either a single or multi-stage contacting zone may be employed, where the contacting zone is to be understood to extend from the lowest of the gas introducing means to the top of bed 16.

In a preferred embodiment of the invention, the contacting zone is a regeneration zone to which is fed fluent solid particles comprising a carbonaceous deposit, such as hydrocarbon conversion catalyst which has accumulated a deposit of coke concomitantly with the cracking of hydrocarbons, or an adsorptive contact mass such as a clay used for refining lubricating oil or an inert porous or non-porous contact material used in the thermal cracking of hydrocarbons. The gas introduced as by conduit 22 and vapor distributor 23 accordingly is a combustion supporting gas such as oxygen, air, partially spent flue gas and the like. Under such conditions, the wall 28 of the vessel, which may be protected on the inside by a refractory lining 29 and on the outside by an insulating layer 31, is cooler than the average temperature of combustion in the regeneration zone because the flow of combustion supporting gas is less in the layer of particles adjacent to the periphery of the contacting zone due to the small size of the particles therein than in the remainder of the contacting zone and hence less heat per unit volume of particles is evolved in said layer than in the remainder of the contacting zone.

The solid particles in conduit 12 are supplied as a stream of restricted area to the apex or top of the body or pile of solid particles 13 (i. e. the diameter of the stream of particles impinging on the top of the body or pile is relatively small in respect to the horizontal extent of the body or pile). Body 13 is of substantial horizontal extent and is confined by sides 26 and bottom 27 of chamber 11. Chamber 11 preferably has sufficient capacity so that body 13 does not completely fill it, the upper surfaces of body 13 thereby being free and inclined to the horizontal at the free angle of repose of the solid particles of which the bed is composed. As shown in Fig. 1, chamber 11 is positioned or located above bed 16 without the housing, but it may be incorporated within housing 10 and form a part thereof. If chamber 11 is within housing 10, the bottom 27 of the chamber 11 is preferably affixed to the walls 28 of housing 10, the top of chamber 11 also being the top of housing 10. At any event, chamber 11 is located above bed 16 so that particles from body 13 can flow downwardly by gravity to bed 16.

As stated above, the average size of the particles in conduits 14 is smaller than that of the particles in conduits 17. This effect is caused by the migration of the fine particles toward the center of body 13 which occurs when the freely falling stream of fluent solid particles varying in size discharges on the top or apex of a body of particles such as body 13. Under such conditions the larger particles roll or move outwardly more rapidly from the center of the body than do the fine particles which therefore tend to accumulate in the central portion of the body, as above outlets 32 which communicate with the open upper ends of conduits 14. However, the particles in any circular annulus concentric with the center of the body have approximately the same distribution of particle size. It is therefore apparent that the individual streams of particles in conduits 17, which discharge from the bottom of body 13 through outlets 33, with which the open upper ends of conduits 17 communicate, have the same particle size distribution and the particles therein will be averagely larger than the particles in conduits 14 due to concentration of the finer particles in the center of body 13.

The above effect is observed when the particles involved comprise such a range of different particle sizes that flow down an inclined path produces a non-uniform distribution of particles of the same size over the cross section of said mass normal to the direction of flow. For example, the bulk of the solid particles may preferably be in the size range of more than 0.05 to less than 0.5 inch in average diameter, with the ratio of the average diameter of largest 5 percent (by volume) of such particles to the smallest 5 percent being generally less than about 20 to 1 and preferably being from about 5 to 1 to about 10 to 1.

In addition to the specific segregation effect described above, in accordance with the invention, other means of effecting segregation may be employed so as to furnish a source of fine particles to be used as described herein. For example, conduits 21 may be long enough so that particles from the central portion of the relatively small bodies of particles 34 in receptacles 19, preferably those baskets adjacent to the wall of the vessel, can be fed to nozzles 15, these nozzles being then conveniently placed lower than baskets 19 so that the particles flow from the receptacles to the nozzles by gravity. Alternatively, a portion of the stream of particles flowing in inclined conduit 12 may be removed by a device, such as that shown in U. S. Patent 2,434,843, issued on January 20, 1948, in the name of F. C. Fahnestock and W. Ullrich, which device removes from such a stream a portion thereof which is relatively concentrated in the smaller particles. The portion concentrated in small particles may then be fed to nozzles 15 by conduits communicating therewith. It is thus apparent to those skilled in the art that, when a mass of fluent solid particles comprising a range of sizes is subjected to flow down an inclined path, such occurs either in body 13 or in an inclined conduit or chute, segregation of the mass according to particle size will result and portions of the mass having different average sizes may be withdrawn from the mass and supplied to the contacting zone as herein described.

As shown in Fig. 2, supply chamber 11 and hence body 13 are of substantial horizontal extent and thus are adapted to provide space for the proper placement of outlets 33 as well as outlets 32 so that these outlets will function in the desired manner. In order that each of the solid streams of particles in conduits 17 have the same distribution of particle size, outlets 33 are arranged equidistantly away from the center of body 13, which center is approximately vertically below the small area or point of discharge of the particles from conduit 12. The locus of the multiplicity of outlets 33 thus forms a circle the center of which is the center of body 13, the individual outlets being arranged, as in Fig. 2, in a symmetrical pattern at regular intervals, although these intervals may be changed if construction advantages result.

In general, the radius of the circle on which outlets 33 lie is approximately one-half to two-thirds of the average distance between the center of the chamber and the sides thereof. In any event, outlets are preferably arranged so as to provide small distances of travel between the upper and lower ends of conduits 17 so that there is as little segregation as possible. Accordingly, body 13 is preferably of approximately the same horizontal extent as that of bed 16, such as less than one and a half and more than one third of the horizontal extent of bed 16. Supply chamber 11 may be circular as shown in Fig. 2 or may be rectilinear, as when it is incorporated in housing 10.

The multiplicity of outlets 32 which individually communicate with nozzles 15 through conduits 14 are grouped as closely as possible at the center of chamber 11 to obtain the maximum concentration of small particles but considerable concentration of such particles may be obtained when the outlets are grouped in circle of small radius whose center is the center of chamber 11. Indeed, by varying the radius of such a circle, the difference between the average size of particles in conduits 14 and 17 can be varied so as to obtain a desired ratio of the rates of flow of gas in the layer of particles adjacent to the periphery and the remainder of the zone (since the rates of flow therein depend on the average particle size).

Alternatively, instead of a multiplicity of outlets such as shown in the drawings, particles from the center of body 13 may be withdrawn through a single outlet as a single stream which is then subdivided into smaller streams which are then directed to nozzles 15. It is thus apparent that various means for withdrawing particles of the desired size from body 13 and supplying them at the top of bed 16 as a layer adjacent to the periphery thereof are within the scope of the present invention.

As shown in the drawings, the solid streams in conduits 17 may be subdivided into smaller solid streams which then flow individually through conduits 18 to the centers of a multiplicity of equal area subdivisions of the major portion of the horizontal cross sectional area of bed 16. (The term, solid stream, is used herein in the sense that a conduit containing such a stream is substantially filled with the fluent solid particles comprising the stream.) The particles in conduits 18 discharge into baskets or receptacles 19 to form relatively small bodies of particles 34 which are concentrically below the open lower ends of conduits 18 and extend laterally to the sides of the receptacles and vertically to the lower end of the conduit thereabove. The relatively small bodies 34 bear a similar relationship to baskets or receptacles 19 that body 13 does to chamber 11, while conduits 21 which communicate with a plurality of outlets from each receptacle, perform a function similar to that of conduits 17 and are similarly arranged equidistantly from the centers of bodies 34, so that the various solid streams from each receptacle have approximately the same distribution of particle size.

Alternatively, conduits 17 may be sufficient in number so that each conduit communicates individually with a single basket, or means other than those shown or described may be used for evenly distributing the relatively larger particles over the major portion of the surface of bed 16. Moreover, appropriate changes may be made when the horizontal cross sectional area of bed 16 is different in shape from that shown in the drawings, as, for example, when the cross section is circular.

As can be appreciated from the above description, the present invention includes within its scope a variety of forms of apparatus for accomplishing the purpose of supplying to a contact zone adjacent to the periphery thereof a layer of particles whose average size is smaller than the average size of particles in the entire contact zone. A contact zone such as that involved in the present invention may be employed for a variety of purposes and processes and is useful in the field of hydrocarbon conversion processes which include the operations of cracking, reforming, hydroforming, hydrogenation, desulfurization, catalytic viscosity breaking, thermal viscosity breaking with an inert solid, thermal cracking of hydrocarbon oils or gases, heat transfer, stock preparation or volatilization and the like.

Exemplary of such processes is the hydrocarbon catalytic cracking process. Particles of hydrocarbon cracking catalysts such as those described herein may be introduced in accordance with the invention to a cracking zone for contact therein with hydrocarbon fractions, such as fractions boiling above gasoline, at cracking temperatures in the range of 600 to 1100° F. or catalyst particles which have been coked may be introduced to a regeneration zone for the removal of all or a portion of the coke deposited on the catalyst under conditions well known to the art which need not be repeated here; for example, a description of a typical process related to the present invention is set forth in "The 'T. C. C.' Cracking Process for Motor Gasoline Production" by R. H. Newton, G. S. Dunham and T. P. Simpson, "Transactions of the American Institute of Chemical Engineers," volume 41, page 215, April 25, 1945, and the articles there cited.

Contact masses for such processes may consist of appropriately sized particles of natural or artificial alumino-silicates, the latter being of the synthetic gel type, or other synthetic gel cracking catalysts such as catalysts containing silica and one or more other refractory oxides. Typical contact masses from natural products are described in U. S. 2,078,945 issued on May 4, 1937, to E. J. Houdry and from synthetic gels in U. S. 2,429,981 issued on November 4, 1947, to J. R. Bates.

In processes of the heat transfer or thermal cracking type, the particles may be composed of one or more refractory oxides such as silica, zirconia, alumina, thoria and the like and may be in a porous or fused state. Also useful are dead burned ores, ground slag, sized heat resistant rocks or pebbles such as quartz, inactive cracking catalyst and the like.

It has been found that the use of the methods of feeding the catalyst or contact mass to such zones as described herein sufficiently protects the walls of the vessels containing such zones that the useful life of such vessels is considerably prolonged with a resultant saving due to a higher on stream efficiency (i. e. less time lost due to shutdowns). Moreover, the protection of the walls permits the operation to proceed at a higher temperature in the bulk of the contact mass in the zone with improvements in the yield or quality of products.

Obviously many modifications and variations of the invention as hereinbefore set forth may be made without departing from the spirit and scope thereof and therefore only such limitations should be imposed as are indicated in the appended claims.

We claim as our invention:

1. In apparatus for the contact of gas with a bed of solid particles, said apparatus comprising a contacting chamber adapted to contain said bed, means for the removal of said solid particles from said contacting chamber, means for the introduction of gas to said contacting chamber, and means for the removal of said gas from said contacting chamber, the combination thereof with a supply chamber adapted to contain a large body of said particles and located above said contacting chamber, said supply chamber having two sets of outlets in the bottom thereof, the outlets in the first set comprising a multiplicity of outlets located at points the locus of which is a circle whose center is the center of said supply chamber and whose radius is between approximately one-half to two-thirds of the average distance between the center of said supply chamber and the sides thereof, means for distributing solid particles discharged through said first set of outlets evenly over the major portion of the horizontal cross-sectional area at the top of the bed in said contacting chamber, the second set of outlets in the bottom of said supply chamber comprising a multiplicity of outlets located substantially at the center of said supply chamber, a multiplicity of open end conduits communicating with said second set of outlets from the supply chamber and extending downwardly below said supply chamber to points spaced above said bed and distributed evenly around the inside walls of said contacting chamber, and means communicating with the lower ends of said conduits for discharging solid particles as a layer closely adjacent to the inside walls of said chamber.

2. In apparatus for the contact of gas with a bed of solid particles, said apparatus comprising a contacting chamber adapted to contain said bed, means for the removal of said solid particles from said contacting chamber, means for the introduction of gas to said contacting chamber, and means for the removal of said gas from said contacting chamber, the combination thereof with a supply chamber of substantial horizontal extent adapted to contain a large body of said particles and located above said contacting chamber, said supply chamber having two sets of outlets in the bottom thereof, the outlets in the first set comprising a multiplicity of outlets located at points the locus of which is a circle whose center is the center of said supply chamber, a multiplicity of open top receptacles below and spaced apart from the top of said contacting chamber, each of said receptacles being at a point located at the center of one of a multiplicity of approximately equal area subdivisions of the major portion of the horizontal cross-sectional area of said contacting chamber, a multiplicity of open end conduits communicating with said first set of outlets and extending downwardly below said supply chamber to points immediately above said receptacles, each receptacle being associated with the open end of one conduit, each of said receptacles being spaced concentrically below the open lower end of each conduit, each of said receptacles having a plurality of outlets in the bottom thereof arranged equidistantly from the center of the receptacle associated therewith, conduits individually communicating with each outlet from said receptacles and extending vertically below said receptacles and communicating with the bed in said contacting chamber, the outlets in the second set of outlets in the bottom of said supply chamber comprising a multiplicity of outlets located substantially at the center of said supply chamber, a multiplicity of conduits individually communicating with said second set of outlets from the supply chamber and extending downwardly below said supply chamber to points spaced immediately above said bed and evenly distributed around the inside walls of said contacting chamber, and nozzles communicating with the lower ends of said last mentioned conduits for discharging particles as a layer closely adjacent to the inside walls of said chamber.

3. The apparatus of claim 2 in which said supply chamber is in a common housing with said contacting chamber and is coextensive in horizontal area with said contacting chamber.

4. In apparatus for the contact of gas with a bed of solid particles, said apparatus comprising a contacting chamber adapted to contain said bed, means for the removal of said solid particles from said contacting chamber, means for the introduction of gas to said contacting chamber, and means for the removal of said gas from said contacting chamber, the combination thereof with a supply chamber of substantial horizontal extent adapted to contain a large body of said particles and located above said contacting chamber, said supply chamber having two sets of outlets in the bottom thereof, the outlets in the first set comprising a multiplicity of outlets located at points the locus of which is a circle whose center is the center of said supply chamber, a multiplicity of open top receptacles below and spaced apart from the top of said contacting chamber, the center of each of said receptacles being at a point located at the center of one of a multiplicity of approximately equal area subdivisions of the major portion of the horizontal cross-sectional area of said contacting chamber, a multiplicity of open end conduits communicating with the outlets from the supply chamber and extending downwardly below said supply chamber to points immediately above said receptacles, each receptacle being associated with the open end of one conduit, each of said receptacles being spaced concentrically below the open lower end of each conduit, each of said receptacles having a plurality of outlets in the bottom thereof arranged equidistantly from the center of the receptacle associated therewith, conduits individually communicating with each outlet from said receptacles and extending vertically below said receptacles and communicating with the bed in said contacting chamber, the outlets in the second set of outlets in the bottom of said supply chamber comprising a multiplicity of outlets located substantially at the center of said supply chamber, a multiplicity of conduits individually communicating with said second set of outlets from the supply chamber and extending downwardly below said supply chamber to points spaced immediately above said bed and evenly distributed around the inside walls of said contacting chamber, and nozzles communicating with the lower ends of said last mentioned conduits for discharging particles as a layer closely adjacent to the inside walls of said chamber.

5. Apparatus for the contact of gas with a bed of solid particles comprising a contacting chamber adapted to contain said bed, a supply chamber adapted to contain a large body of said particles and located above said contacting chamber, means for discharging particles from the bottom of said supply chamber at a multiplicity of points the locus of which is a circle whose center is the center of said supply chamber, means for distributing solid particles discharged from said supply chamber at said points evenly over the major portion of the horizontal cross-sectional area at the top of the bed in said contacting chamber, means for discharging particles from the bottom of said supply chamber substantially at the center thereof, a multiplicity of conduits communicating with said means for discharging particles from the center of the bottom of said supply chamber and extending downwardly below said supply chamber to points spaced above said bed and distributed evenly around the inside walls of said contacting chamber, and means communicating with the lower ends of said conduits for discharging solid particles as a layer closely adjacent to the inside walls of said chamber.

CLAUDE C. PEAVY.
ROBERT M. SHIRK.

REFERENCES CITED

The following references are of record in the file of this patent:

UNITED STATES PATENTS

| Number | Name | Date |
|---|---|---|
| 1,144,730 | Schaefer | June 29, 1915 |
| 2,381,351 | Hardinge | Aug. 7, 1945 |
| 2,423,013 | Evans | June 24, 1947 |
| 2,459,056 | Watson | Jan. 11, 1949 |
| 2,477,281 | Bergstrom | July 26, 1949 |

FOREIGN PATENTS

| Number | Country | Date |
|---|---|---|
| 14,371 | Great Britain | 1907 |